US006180056B1

(12) United States Patent
McNeel et al.

(10) Patent No.: US 6,180,056 B1
(45) Date of Patent: Jan. 30, 2001

(54) METHOD AND COMPOSITIONS FOR MINIMIZING BIOLOGICAL AND COLLOIDAL FOULING

(75) Inventors: Thomas E. McNeel, Mem, TN (US); Daniel L. Comstock, Escondido, CA (US); Maryam Z. Anstead, Houston, TX (US); Richard A. Clark, Collierville, TN (US)

(73) Assignees: Buckman Laboratories International Inc., Memphis, TN (US); Betz Dearborn Inc., Trevose, PA (US)

(*) Notice: Under 35 U.S.C. 154(b), the term of this patent shall be extended for 0 days.

(21) Appl. No.: 09/208,473

(22) Filed: Dec. 10, 1998

(51) Int. Cl.[7] .................................................... C23F 14/02
(52) U.S. Cl. ............................ 422/15; 422/28; 210/636; 210/639; 210/652; 252/175
(58) Field of Search ..................... 422/15, 28; 252/175, 252/389.22, 390, 394; 210/636, 639, 652, 653, 654, 749, 500.38

(56) References Cited

U.S. PATENT DOCUMENTS

| Re. 28,553 | * | 9/1975 | Von Freyhold . | |
|---|---|---|---|---|
| 3,336,221 | * | 8/1967 | Ralston . | |
| 3,985,671 | * | 10/1976 | Clark . | |
| 3,992,318 | * | 11/1976 | Gaupp et al. . | |
| 4,719,083 | * | 1/1988 | Baker et al. | 422/15 |
| 4,806,259 | * | 2/1989 | Amjad . | |
| 4,874,526 |   | 10/1989 | Grade et al. | 210/697 |
| 5,047,154 |   | 9/1991 | Comstock et al. | 210/636 |
| 5,198,116 |   | 3/1993 | Comstock et al. | 210/636 |
| 5,374,357 |   | 12/1994 | Comstock et al. | 210/666 |
| 5,670,055 |   | 9/1997 | Yu et al. | 210/698 |

FOREIGN PATENT DOCUMENTS 0 480 589 A1  4/1992  (EP) ................................ C02F/5/14

OTHER PUBLICATIONS

Heaton, P.E. "A new biocide for industrial water treatment and oilfield applications," Biodeterior. Biodegrad. 9, Int. Biodeterior. Biodegrad. Symp., [Proc.], 9th., meeting date 1993, 128–132, 1995.*

* cited by examiner

Primary Examiner—Robert J. Warden, Sr.
(74) Attorney, Agent, or Firm—Kilyk & Bowersox, P.L.L.C.

(57) ABSTRACT

A composition for minimizing biological and/or colloidal fouling is described, which includes an anionic antiscalant and a cationically charged biocide. Further, a method of controlling fouling is described and achieved by introducing a formulation of the present invention into an aqueous system which uses a separation membrane. The compositions used in the present invention are compatible with such separation systems and preferably prevent membrane fouling.

25 Claims, 16 Drawing Sheets

NORMALIZED SALT PASSAGE VS. TIME: THPS

POLYAMIDE MEMBRANE-BENZALKONIUM CHLORIDE COMPATIBILITY

METHOD AND COMPOSITIONS FOR
MINIMIZING BIOLOGICAL AND
COLLOIDAL FOULING

BACKGROUND OF THE INVENTION

The present invention relates to certain compositions and processes useful for minimizing biological and colloidal fouling. The present invention further relates to compositions and methods for minimizing biological and colloidal fouling in aqueous systems that use separation membranes. General embodiments of such aqueous systems, include but are not limited to, nanofiltration, ultrafiltration, microfiltration and particularly reverse osmosis processes. The compositions of the present invention preferably show unexpected efficacy in minimizing biological and colloidal fouling.

Reverse osmosis (RO) is a process commonly used in commercial, industrial, and home liquid purification systems. RO processes purify liquids that contain undissolved and dissolved impurities. The liquid to be purified is passed over a RO membrane. The "permeate" passes through the reverse osmosis membrane and is collected as purified liquid, while the remaining liquid, or "concentrate" is discarded or further processed. The successful practice of a RO process is inhibited by accumulating colloidal dispersions and biofouling.

Biofouling can be considered as one of the last major unresolved problems affecting RO processes. This is because the most common RO membrane type in use today cannot tolerate chlorine or other oxidizing biocides. For this reason, chlorine must generally be removed from the feedstreams to these systems. However, without the presence of a chlorine residual, microorganisms quickly colonize and biofoul membrane surfaces. The approach of the industry thus far has been either to ignore the problem and accept high operating costs due to biofouling, or to add non-oxidizing biocides to these plants. It has been estimated that the cost of biofouling may total as high as $0.25 per 1000 gallons of RO permeate produced. This high cost makes biofouling control by non-oxidizing biocides economically attractive.

However, there are a significant number of drawbacks to many of the non-oxidizing biocides currently available. Specifically, non-oxidizing biocides are known to be highly toxic, incompatible with RO membranes, produce unwanted side reactions with other treatment chemicals or feedwater constituents, and/or adversely affect downstream processes where excess biocides passes through RO membranes.

Accordingly, there is a need in the art for a biocidal composition that overcomes these and other problems.

SUMMARY OF THE INVENTION

It is therefore an object of the present invention to provide a novel method and composition for minimizing biological and colloidal fouling, preferably without one or more of the drawbacks discussed above.

Additional features and advantages of the invention will be set forth in the description, which follows, and in part will be apparent from the description, or may be learned by practice of the present invention. The advantages of the present invention will be realized and obtained by the method and composition of matter, particularly, pointed out in the written description and claims thereof.

To achieve these and other advantages and in accordance with the purpose of the invention, as embodied and broadly described, the present invention relates to a composition which includes at least one anionic antiscalant and at least one cationically-charged biocide. The anionic antiscalant and cationically-charged biocide are present in any amount effective to control or minimize colloidal and/or biological fouling.

The present invention also relates to a method to control colloidal and/or biological fouling in an aqueous system involving the use of a separation membrane system. The method involves the introduction of a formulation containing at least one anionic antiscalant and at least one cationic biocide to an aqueous system upstream of the separation membrane, in an effective amount to control or reduce the colloidal and/or biological fouling in the aqueous solution.

It is to be understood that both the foregoing general description and the following detailed description are exemplary and explanatory and are intended to provide further explanation of the invention as claimed.

DETAILED DESCRIPTION OF THE INVENTION

Figure 1:
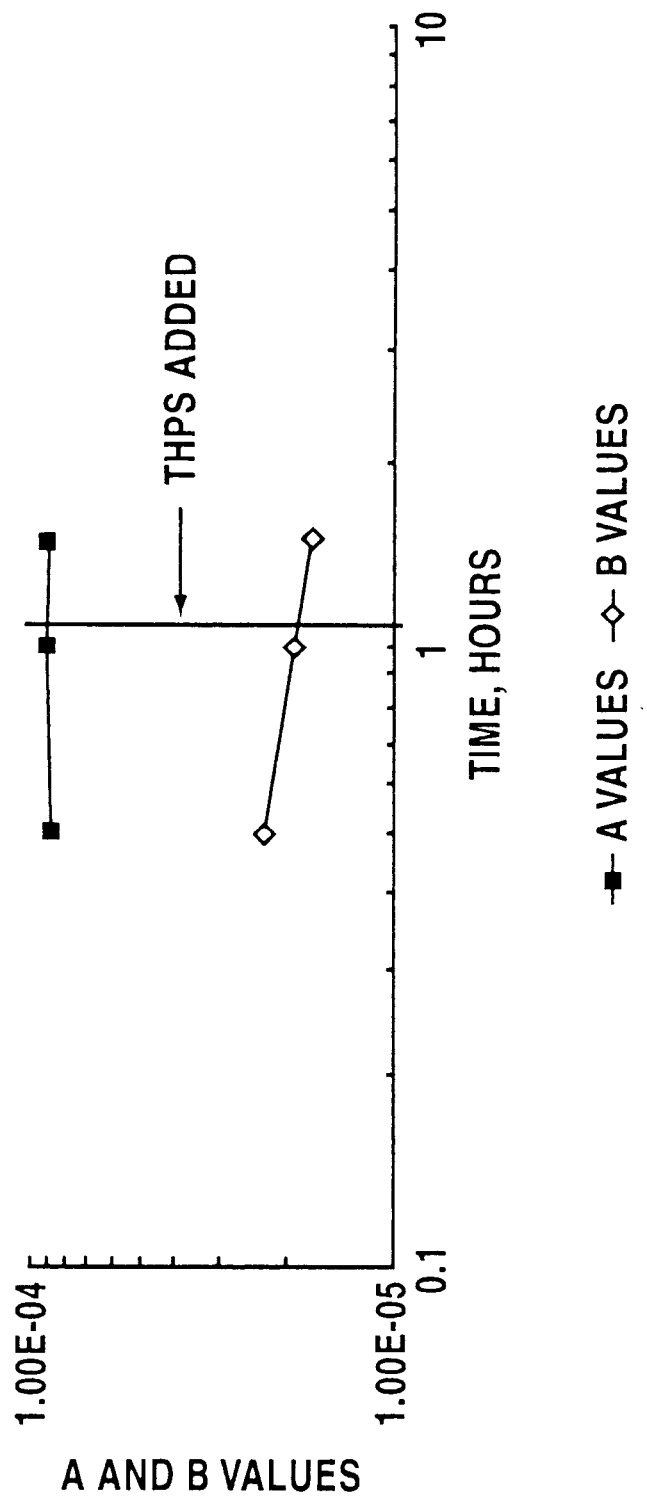
FIGS. 1 and 2 are graphs representing compatibility tests between the FSD TFCL membrane and tetrakishydroxymethylphosphonium (THPS) and poly(oxyethlylene (dimethyliminio)ethylene(dimethyliminio)ethylene dichloride) (WSCP).

The present invention is directed to the use of a composition or formulation for minimizing or controlling biological and/or colloidal fouling comprising at least one antiscalant and at least one cationically-charged biocide.

The compositions or formulations of the present invention are advantageously used in aqueous systems involving the use of at least one separation membrane such as a reverse osmosis membrane. The compositions or formulations of the present invention are introduced at a point upstream from the location of the separation membrane used in the aqueous system. Preferably, the aqueous system involving the use of a separation membrane also uses at least one pre-filter located upstream from the separation membrane. The compositions or formulations of the present invention can be introduced upstream from the pre-filter if one is present or introduced at any location between the pre-filter and the separation membrane. The compositions or formulations of the present invention can be introduced as a single prepared formulation or the components of the formulation can be added separately into the aqueous system as long as the components are introduced upstream from the separation membrane. The use of the compositions and formulations of the present invention at such a separation system for aqueous solutions, such as water is advantageous since the formulations of the present invention have the ability to control fouling, such as biological and/or colloidal fouling which exists in separation systems without substantially hindering and/or having detrimental effects on the separation membrane which include membrane fouling. Such detrimental effects include, but are not limited to, loss in permeate flow and salt rejection.

The use of the compositions of the present invention are viable and advantageous because they are formulated using cationically-charged biocides, which are unexpectedly compatible with separation membrane systems, such as RO membranes, especially polyamide RO membranes and membranes with related chemistries, including, but not limited to, membranes used in nanofiltriation, ultrafiltration, microfiltration, and the like. Previously, cationically-charged surfactants were considered to be incompatible with separation membranes because the cationically-charged surfactants reacted with the membranes, and thus could lead to membrane fouling. However, the present invention makes use of a class of cationically-charged biocides suitable for use with separation membranes, including RO membranes, and preferably avoids or controls membrane fouling.

The anionic antiscalant and cationically-charged biocide may be present in any amount effective to minimize, control, or prevent biological and/or colloidal fouling. Effective treatment varies in accordance with the aqueous system used. While any effective amount of the anionic antiscalant and the cationically-charged biocide can be used, preferably, the anionic antiscalant and cationically-charged biocide are present at a weight ratio of from about 0.1:1 to about 5:1, more preferably from about 0.5:1 to about 3:1, and most preferably from about 0.7:1 to about 1.3:1. One skilled in the art in view of this disclosure can routinely determine the optimal amounts of the anionic antiscalant and cationically-charged biocide for a particular application.

With respect to the anionic antiscalant present in the compositions of the present invention, the anionic antiscalant can be any anionic antiscalant composition which has antiscalant properties, such as an anionic polymer or compound. Examples of such antiscalants include but are not limited to 1-Hydroxyethane-1,-diphosphonic acid (HEDP), Aminotri(methylenephosphonic acid) (ATMP), diethylenetriaminepenta (methylenephosphomic acid) (DETPMP), 2-Hydroxyethyliminobis (methylenephosphonic acid) (HEBMP), polyacrylic acids and derivatives thereof and salts thereof Preferably, the antiscalant is a phosphonate based antiscalant. Combinations of two or more antiscalants can be used as well. The antiscalant is present in an amount to prevent, minimize, or control antiscaling in an aqueous system. Preferably, the amount of the antiscalant is from about 5% to about 70%, more preferably from about 10% to about 30%, and most preferably from about 15% to about 25%, based on the weight of the total amount of anionic antiscalant and cationically-charged biocide present. Typical phosphonate based antiscalants may include without limitation 1-Hydroxyethane-1,1-diphosphonic acid (HEDP), Diethylenetriaminepenta(methylenephosphonic acid) (DETPMP), Aminotri(methylenephosphonic acid) (ATMP), 2-Hydroxyethyliminobis (methylenephosphonic acid) (HEBMP), Hexamethylenediamine (tetramethylenephosphonate), potassium salt (HMTP), Bis(hexamethylene)triamine(pentamethylenephosphonic acid) (BHMTPMP), Phosphorous Acid (PA), or any combination thereof The above listed phosphonate based antiscalants are commercially available from Albright and Wilson, Solutia, or Mayo.

With respect to the biocide, the biocide is preferably a cationically-charged biocide. Preferably, the cationically-charged biocide has no hydrophobic moieties, for example, no alkyl groups having $C_8$ or more, such as $C_{10}$–$C_{18}$ alkyl groups, or no aromatic groups. Specific examples of biocides include, but are not limited to, tetrakishydroxymethylphosphonium sulfate (THPS), poly(oxyethylene (dimethyliminio)ethylene(dimethyliminio)ethylene dichloride) (WSCP), or any combinations thereof THPS is commercially available from Albright and Wilson. WSCP is commercially available from Buckman Laboratories International, Inc. These cationically-charged biocides are also preferred in liquid purification systems because they have low toxicity levels. The biocides are present in amounts such as to minimize, control, or prevent the presence or growth of microorganisms, especially bacteria. Preferably, the amount of the biocide is from about 5% to about 50%, more preferably from about 10% to about 40%, and most preferably from about 15% to about 36%, based on the total weight of the anionic antiscalant and cationically-charged biocide present, (i.e., on an active basis).

The present invention is further directed to a method of minimizing or controlling fouling in an aqueous system by introducing at least one anionic antiscalant and at least one cationically-charged biocide as described above to an aqueous system in a sufficient amount to minimize or control the fouling. Generally, fouling occurs when the operational efficiency of an aqueous system is reduced, as a result of the gradual accumulation of colloidal solids and/or biological growth in pipes or on process components. Particularly, the accumulation of colloidal solids and/or biologically growth gradually builds to form layers that interfere with the operation of the system components.

The present invention may be used with a variety of aqueous systems. Specific examples of aqueous systems include, but are not limited to, aqueous systems which are susceptible to bacteria and/or fungal deterioration and/or degradation unless steps are taken to inhibit such degradation and deterioration. Specific examples include aqueous systems used in the making of paper and paper containing products, metal finishing, power, electronics, chemical, petroleum, mining, biological and industrial waters, metal working fluids, cooling tower water, drinking water systems, and other industrial water systems which are used in the process and preparation of products and material. Preferably, the aqueous system for purposes of the present invention is an aqueous system used in paper mills. These include without limitation the liquid filtration systems recited in U.S. Pat. No. 5,374,357, which is incorporated in its entirety by reference herein. Generally, the present invention can be used in any aqueous system which involves the use of at least one separation membrane for filtration purposes.

Generally, each component of the composition of the present invention can be added separately to an aqueous system or may be combined first and then introduced into the water system. Preferably, a formulation of the various components comprising the present invention are first prepared and then added as a single formulation into the aqueous system. Generally, in making the formulation of the present invention, the above-described ingredients can be simply mixed together to form the formulation. The formulation can then be dispersed into the aqueous system in any manner used to disperse liquid or solid components. In some cases, it may be necessary to neutralize the acidity of the antiscalant to prevent degradation of the biocide. For example, in the case of THPS-containing formulations, caustic soda or other similar agent should be added to the THPS and be completely dissolved in the antiscalant solution to raise the pH to 7 prior to the addition of the THPS. Likewise, it may be necessary to lower the pH of some other biocides to prevent the precipitation of antiscalant:biocide ion pairs from the formulation. Preferably, the composition whether in a single formulation or as separate components is dispersed into the aqueous system in order to more effectively control or inhibit the growth of the microorganisms and to prevent and/or control scaling.

The compositions of the present invention or formulations containing the compositions of the present invention can be diluted by simply taking the formulation and diluting it with an appropriate amount of water or other suitable medium to create the necessary weight percent of active ingredients for whatever need is called for.

The present invention also relates to a method of minimizing or controlling fouling in an aqueous system by introducing a composition comprising at least one antiscalant and at least one cationically-charged biocide to an aqueous system. In particular, the compositions of the present invention may be used to minimize fouling in an aqueous system, wherein the aqueous system includes a separation membrane, such as an RO membrane.

Generally, in this process, the components of a composition can be added as a single formulation or as separate components such that the composition is present in the aqueous system at some point in time. The composition can be added in any manner in which a liquid or solid product is added to a system such as by a chemical feed pump. In a preferred embodiment, the present invention is used in the aqueous systems used for producing high-purity or portable water in which the absence of biocide in the permeate water is a necessity. Aqueous systems include those systems used in the making of paper and paper containing products, metalworking fluids, power, electronics, chemical, petroleum, mining, biological and industrial waste waters, cooling tower water, and drinking water systems. In such systems, the composition of the present invention is preferably added following multimedia filtration and prior to cartridge filtration, which is ahead of the membrane separation system.

The present invention also relates to a method of controlling the growth of microorganisms in an aqueous system which involves the introduction of the composition of the present invention as described above, in an amount effective to control the growth of at least one microorganism. The steps of introducing the composition for this method would be the same or similar to the introduction steps described above.

It is further understood by "controlling," (i.e., preventing or minimizing or reducing) the growth of at least one type of microorganism, the growth of at least one microorganism is inhibited. In other words, there is no growth or essentially no growth of at least one microorganism. "Controlling" the growth of at least one microorganism can also maintain the microorganism population at a desired level, reduce the population to a desired level (even to undetectable limits, e.g., 0 population), and/or inhibit the growth of at least one microorganism. Thus, the systems in which the compositions of the present invention are used can also preserve from attack and the resulting spoilage and other detrimental effects caused by microorganisms. Further, it is also to be understood that "controlling" the growth of at least one microorganism also includes biostatically reducing and/or maintaining a low level of microorganisms such that the attached microorganisms and any resulting spoilage or other detrimental effects are mitigated, i.e., the microorganism growth rate or microorganism attack rate is slowed down or eliminated. Microorganisms, as used herein, include, but are not limited to, bacteria, fungi, and/or algae, including both yeast and mold. Examples of such microorganisms include, but are not limited to, *Bacillus cereus, Desulfovibrio vulgaris, Enterobacter aerogenes, Escherichia coli, Aspergillus niger, Candida albicans*, and *Anacystis nidulans*.

The present invention will be further clarified by the following examples, which are intended to be purely exemplary of the present invention. Unless stated otherwise, the amounts set forth below are based on percents by weight of the composition of the present invention.

EXAMPLES

Three formulations were investigated either in bench scale systems or in a RO system. The first formulation consisted of HEDP and DETPMP and was used as a control to compare with two phosphonate-biocide containing mixtures. One of these mixtures contained HEDP, DETPMP and THPS. The second contained HEDP, DETPMP, and WSCP. The formulations are described below.

Procedures

Test formulations

Three formulations were investigated in the laboratory and within a small pilot RO system. The first formulation consisted of HEDP and DETPMP and was used as a control to compare with the two phosphonate-biocide containing mixtures. One of these mixtures contained HEDP, DETPMP and THPS. The second contained HEDP, DETPMP, and WSCP. Formulations are described in the table below.

| | WEIGHT PERCENT INGREDIENT | | |
|---|---|---|---|
| INGREDIENT | PHOSPHONATE CONTROL | PHOSPHONATE PLUS THPS | | PHOSPHONATE PLUS WSCP |
| Water | 58.5 | 33.8 | 10.4 | 35.1 |
| ADPA-60AW[1] | 21.4 | 21.4 | 21.4 | 21.4 |
| 543-45 AS[1] | 14.3 | 14.3 | 14.3 | 14.3 |
| 50% NaOH | 5.8 | 7.2 | 7.2 | |
| Tolcide PS75[2] | | 23.3 | 46.7 | |
| Buckman WSCP[3] | | | | 29.2 |

[1]ADPA-60AW is HEDP. 543-45AS is DETPMP. HEDP and DETPMP solutions contain 60 and 45% actives, respectively. Both products were obtained from Albright Wilson.
[2]Tolcide PS75 is a 75% active solution of THPS obtained from Albright and Wilson.
[3]WSCP is a 60% active solution obtained from Buckman Laboratories.

Cross Flow Fouling Index (CFI) tests, used to predict the colloidal fouling potential of reverse osmosis feedwaters, were conducted on the phosphonate control and THPS-phosphonate mixtures added to municipal water samples. These tests were run to assess the affect of the test formulations on colloidal fouling of membrane surfaces. (The WSCP mixture could not be evaluated by this procedure since the active ingredient contained in WSCP is known to foul the polysulfone membrane employed in the CFI test procedure.

Final screening tests were conducted on a small polyamide RO system. The system was run on dechlorinated water filtered by JelCleer and followed by a 1 micron cartridge filter. Dechlorination was achieved by the addition of 3.5 ppm sodium metabisulfate to the JelCleer filter feed. The municipal water feed contained 2 ppm of total chlorine.

The RO system itself consisted of a 2:1 array with a single FSD 4820HR element per vessel. Concentrate velocity was maintained by a 6.3 gpm brine-to-feed recycle. Permeate flow was 5 maintained at 2.5 gpm. A permeate recovery rate of 75% was achieved. A feedwater analysis is listed in the table below.

| ION | CONCENTRATION, PPM |
|---|---|
| Calcium | 64 |
| Magnesium | 26 |
| Sodium | 86 |
| Potassium | 5 |
| Barium | 0 |
| Strontium | 2.4 |
| Iron | 0.02 |
| Aluminum | 0.09 |
| Silica | 9.6 |
| Sulfate | 270 |
| Bicarbonate | 149 |
| Chloride | 89 |
| Nitrate | 10 |
| Phosphate | 1.5 |
| Fluoride | 0.5 |
| pH | 7.7 |
| Conductivity, uMhos/cm | 1,000 |

These formulations described above were added to the RO system feed at a neat dosage of 2 ppm. The pilot plant was cleaned with Bioclean 103A and IPA 411 after each test series.

During the RO tests, biocide passage through the polyamide membranes was estimated by TOC analyses of feed, permeate, and concentrate streams. Frequent bacteria counts of these streams were also made with the PetriFilm™ procedure.

For a final THPS evaluation, a flat sheet cell test apparatus was plumbed to the pilot plant concentrate pressure gauge tap. Following the test, the membrane sample was removed for microbiological examination. The pilot plant performance data were normalized with a Lotus 1-2-3 spreadsheet program, that contained ASTM approved normalization equations.

CFI Results

Figure 2:
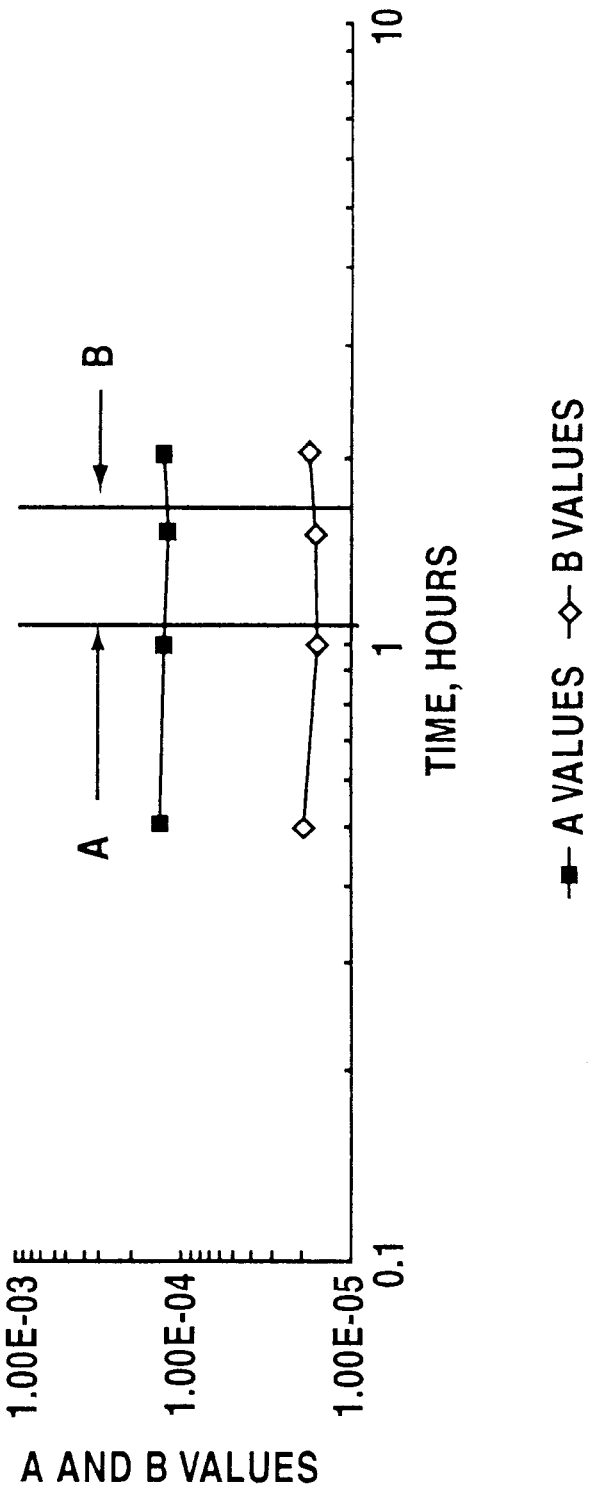

Compatibility test between FSD TFCL membrane and THPS and WSCP were conducted. TUPS was evaluated at 11 ppm active concentration in dechlorinated tap water. WSCP was evaluated at 0.6 and 3 ppm active concentrations. These results are plotted in FIGS. 1 and 2. In FIG. 2, 0.6 ppm WSCP was added at point A. A total of 3 ppm WSCP was added at point B.

The CFI test results of the two city water sources dosed with test formulations are tabulated below.

| Water Source | Additive | PPM Additive | CFI | % Change in CFI |
|---|---|---|---|---|
| San Marcos | — | — | −0.143 | — |
| | Control | 1 | −0.137 | −4.2 |
| | Control | 3 | −0.135 | −5.6 |
| | +THPS | 1 | −0.118 | −17.5 |
| | +THPS | 3 | −0.133 | −7 |
| Escondido | — | — | −0.122 | — |
| | Control | 1 | −0.126 | 3.3 |
| | Control | 3 | −0.113 | −7.4 |
| | +THPS | 1 | −0.11 | −9.8 |
| | +THPS | 3 | −0.12 | −1.6 |

In the table, control refers to phosphonate addition only. +THPS refers to phosphonates plus THPS. PPM additive refers to the neat concentration of formulation added. The THPS formulation referred to contains 23% Tolcide PS75. A negative change in CFI means that a reduction in colloidal fouling rate was seen relative to the raw water. A positive value means there was an increase in colloidal fouling rate relative to the raw water.

RO Results

Figure 3:
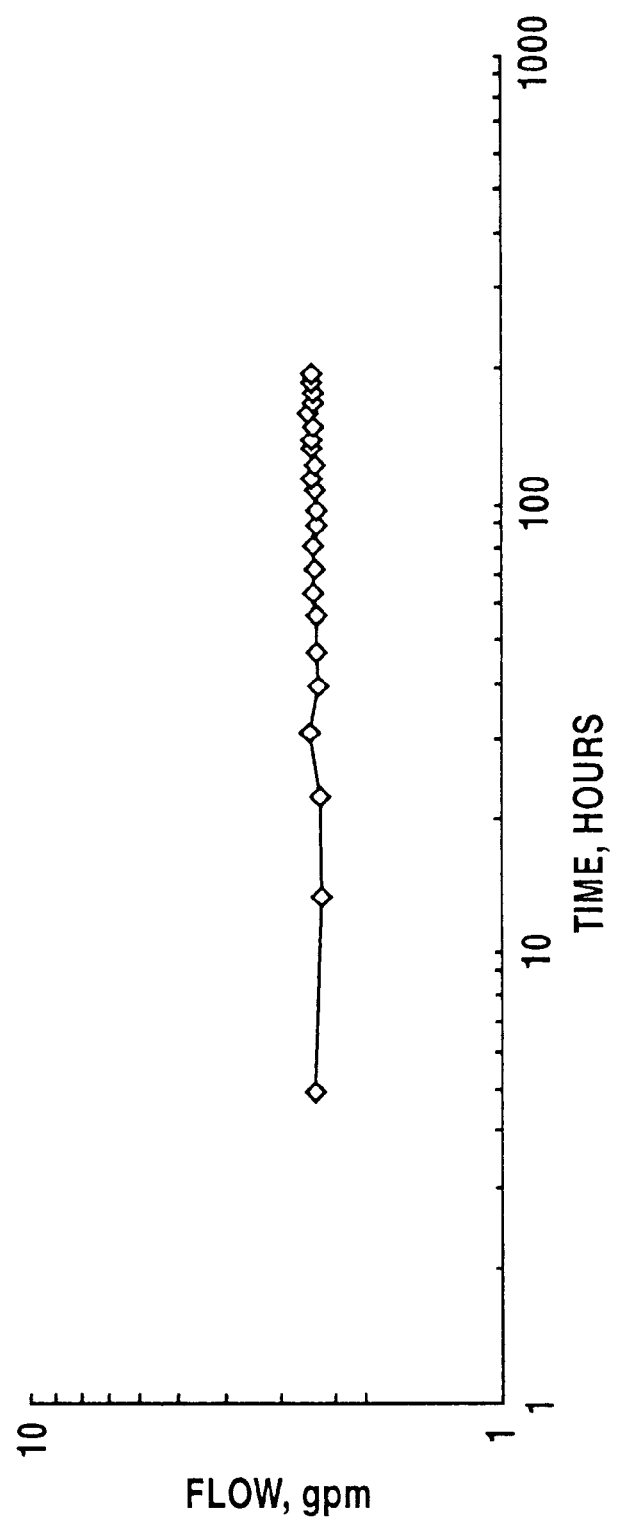
FIG. 3 is a graph representing RO tests showing normalized permeate flow vs. time.
Figure 4:
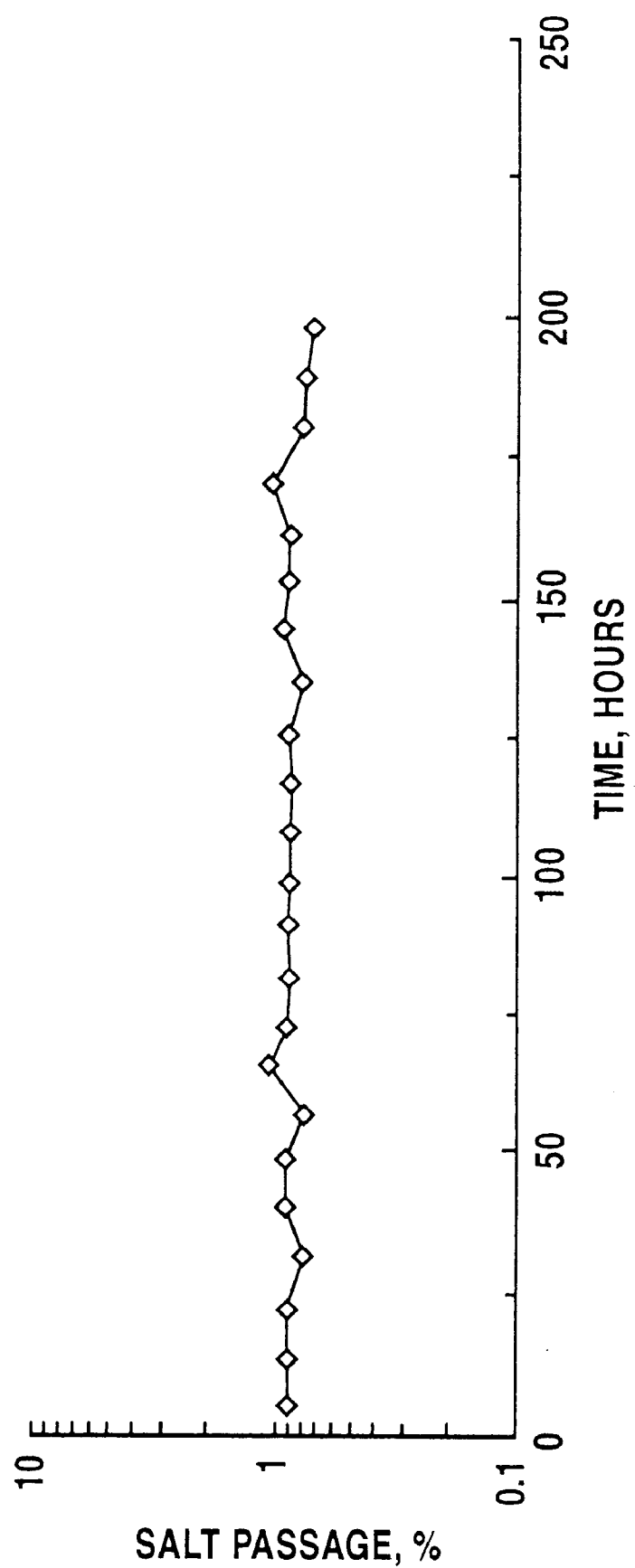
FIG. 4 is a graph representing RO tests showing normalized salt passage vs. time.
Figure 5:
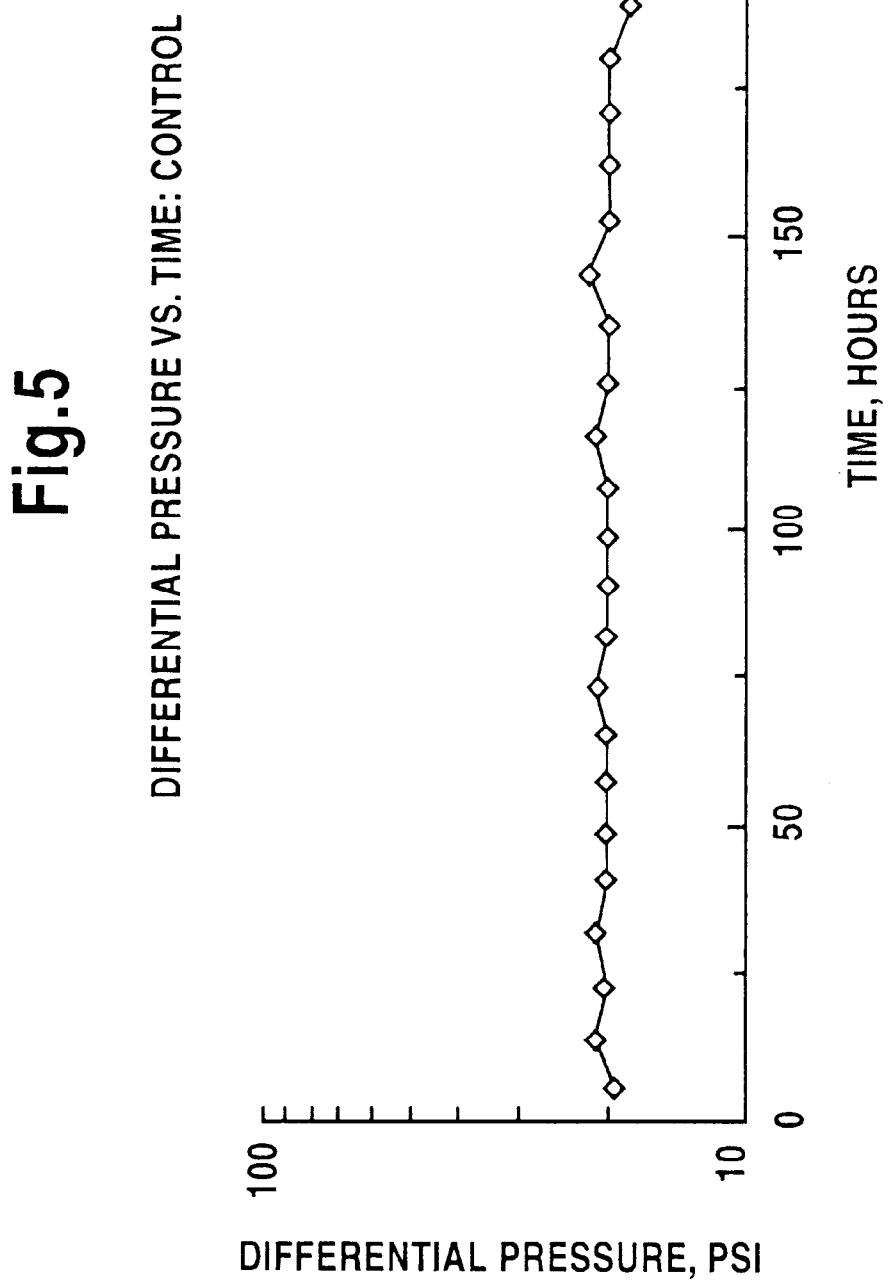
FIG. 5 is a graph representing RO tests showing differential pressure vs. time.
Figure 6:
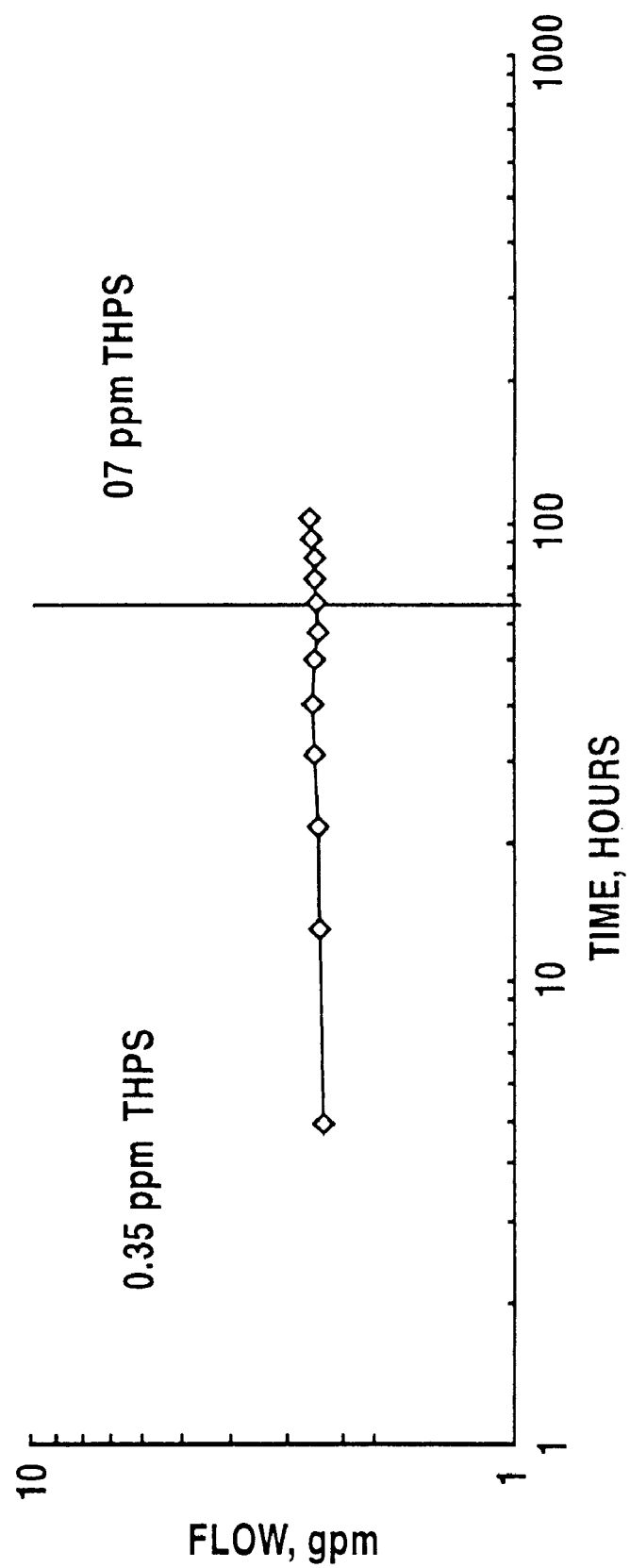
FIG. 6 is a graph representing phosphonate plus tetrakishydroxymethylphosphonium sulfate (THPS) test showing normalized permeate flow vs. time.
Figure 7:
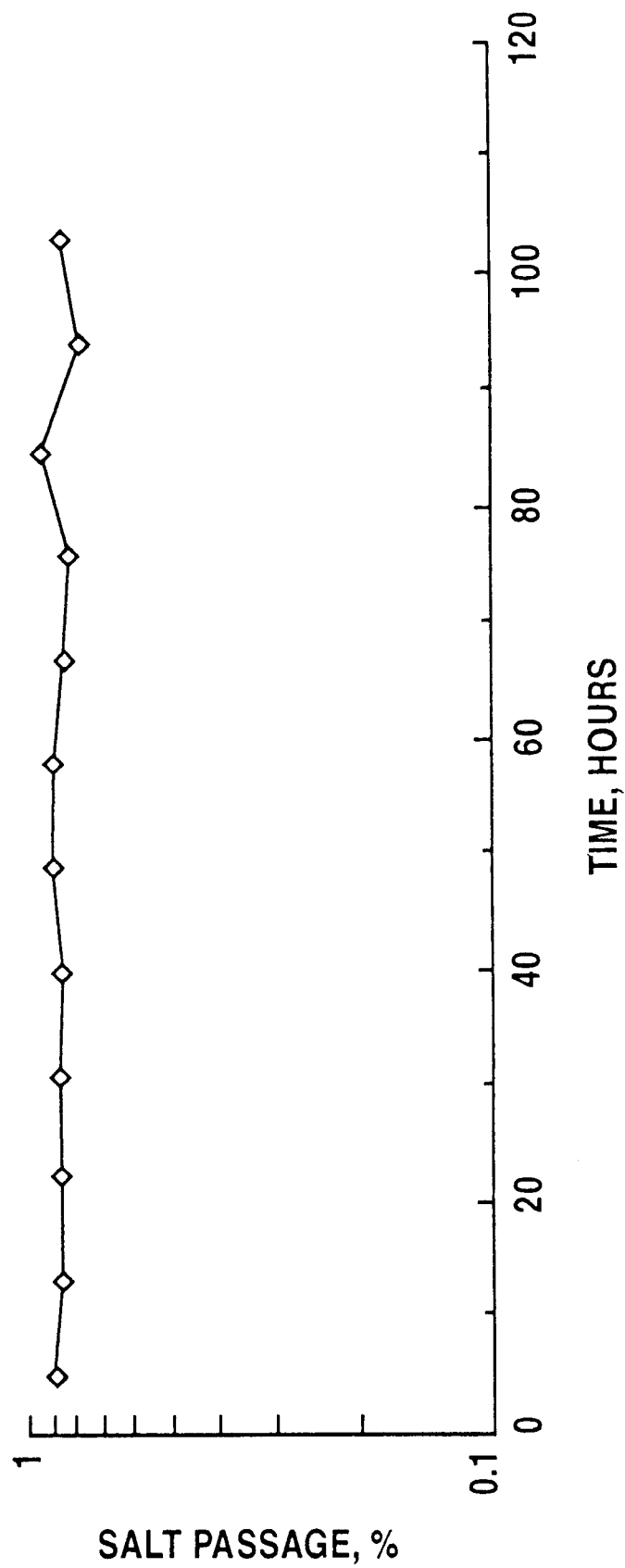
FIG. 7 is a graph representing phosphonate plus tetrakishydroxymethylphosphonium sulfate (THPS) test showing normalized salt passage vs. time.
Figure 8:
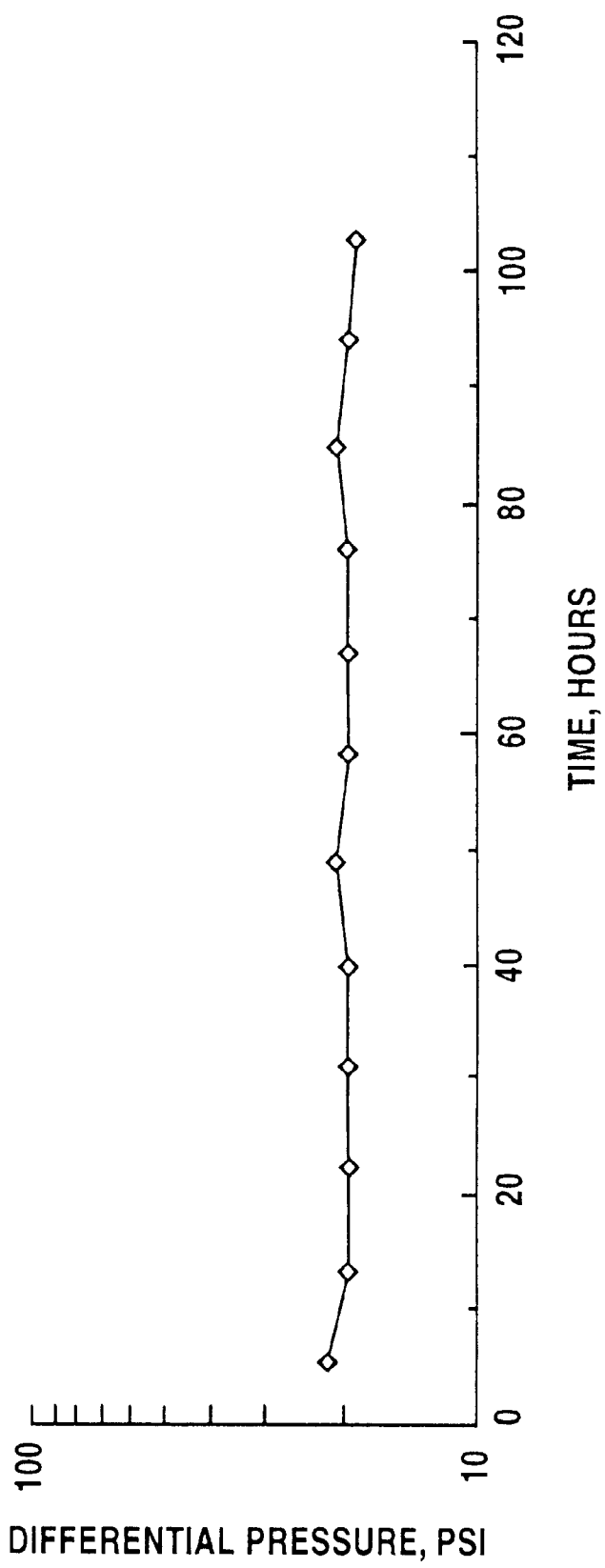
FIG. 8 is a graph representing phosphonate plus tetrakishydroxymethylphosphonium sulfate (THPS) test showing differential pressure vs. time.
Figure 9:
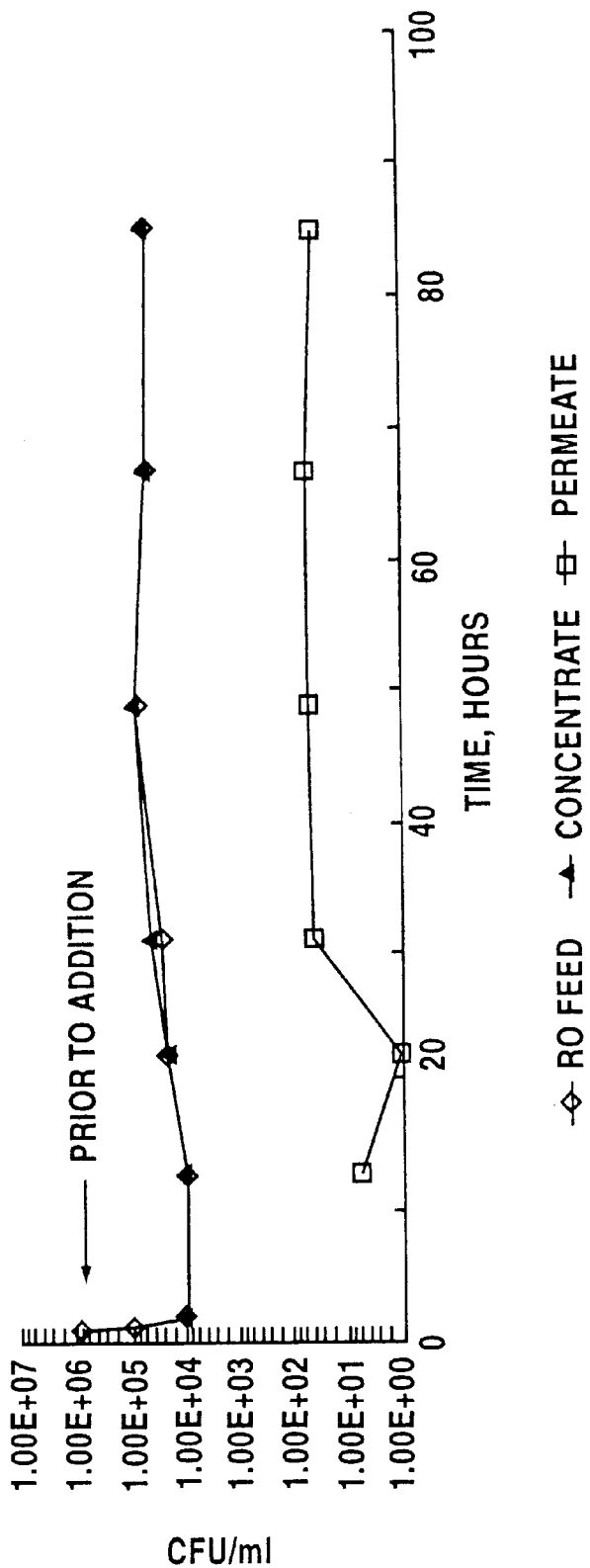
FIG. 9 is a graph representing phosphonate plus tetrakishydroxymethylphosphonium sulfate (THPS) test showing bacteria counts vs. time.

A 200 hour control run was made initially with the addition of the phosphonate mixture to the RO system feed. During this test, feedwater turbidity and CFI values averaged 0.04 NTU and −0.157, respectively. Feedwater temperature averaged 20 degrees centigrade. Normalized flow, salt passage, and differential pressure values are plotted vs. time in FIGS. 3 through 5.

Results from a 100 hour phosphonate plus THPS test run are plotted in FIGS. 6 to 9. During the first 80 hours of the test, active THPS was maintained at 0.35 ppm. For the remainder of the 100 hour test, THPS was increased to 0.7 ppm. During these tests, feedwater turbidity and CFI values averaged 0.02 NTU and -0.162, respectively. Feedwater temperature averaged 22.6 degrees Centigrade.

FIGS. 10 through 13 plot WSCP test results from a 200 hour run. During this test, WSCP dosage was maintained at a 0.35 ppm active concentration in the feedstream for the first 90 hours of the test. For the next 32 hours only phosphonate was fed. For the remaining 30 hours, WSCP was fed at an active dosage of 3 ppm (along with 2 ppm neat phosphonate solution). During these tests, feedwater turbidity and CFI averaged 0.01 NTU and −0.145 respectively. Feedwater temperature averaged 26.3 degrees Centigrade.

Figure 14:
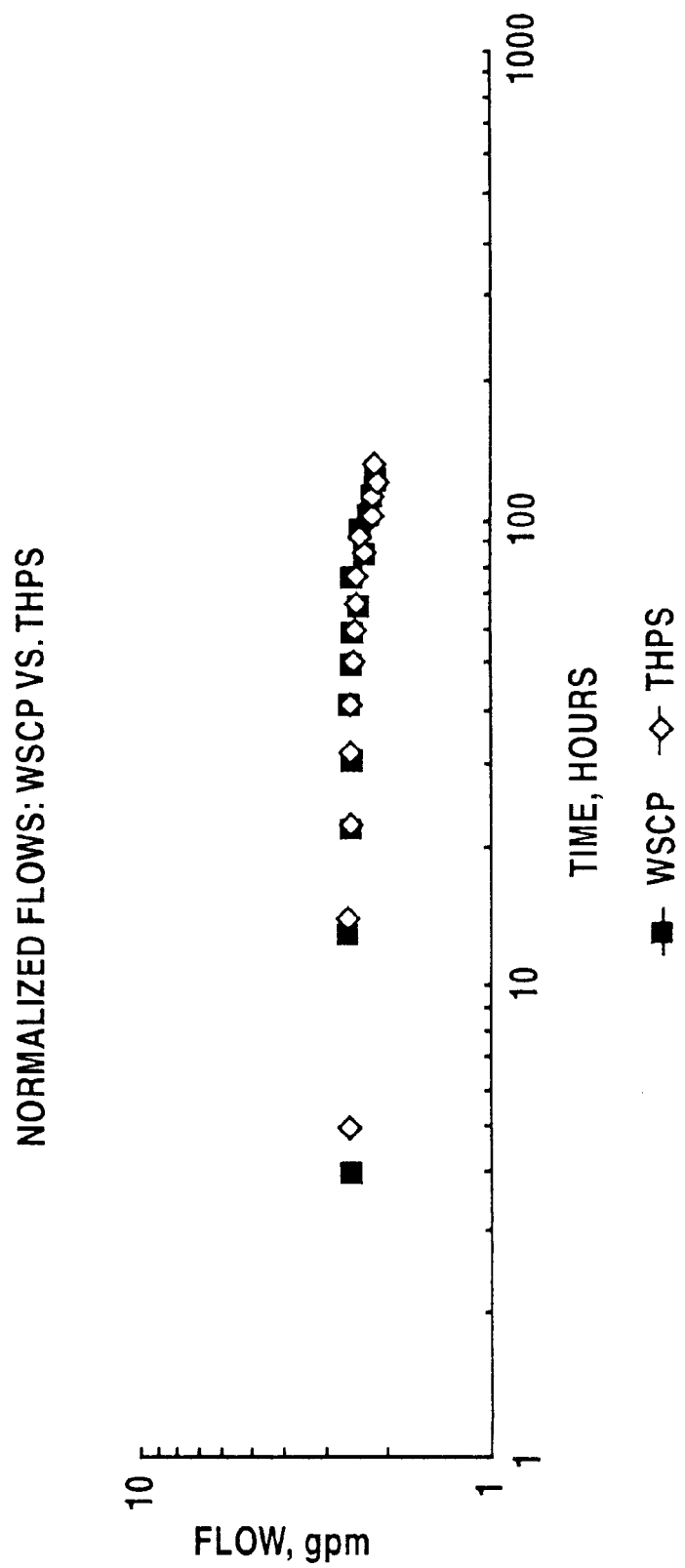
FIG. 14 is a graph showing normalized poly(oxyethylene (dimethyliminio)ethylene(dimethyliminio)ethylene dichloride) (WSCP) flow vs. normalized tetrakishydroxymethylphosphonium sulfate (THPS) flow.

A final 137 hour THPS test was run to help determine whether the fouling observed during the WSCP test was due to WSCP or to other factors. FIG. 14 plots normalized THPS test permeate flow over the WSCP test results. Feedwater turbidity and CFI results averaged 0.04 NTU and −0.134, respectively. Feedwater temperature averaged 29.8 degrees Centigrade.

The feed, permeate, and concentrate TOC results from control, THPS, and WSCP tests are tabulated in the following table.

| Chemical Addition | PPM Addition | Sample Point | PPM TOC |
|---|---|---|---|
| Control | 2 | Feed | 4.2 |
|  |  | Permeate | 0.1 |
|  |  | Concentrate | 15.5 |
| +THPS | 2 | Feed | 5.4 |
|  |  | Permeate | 0.036 |
|  |  | Concentrate | 18.8 |
| +WSCP | 2 | Feed | 3.9 |
|  |  | Permeate | 0.07 |
|  |  | Concentrate | 16 |

Figure 15:
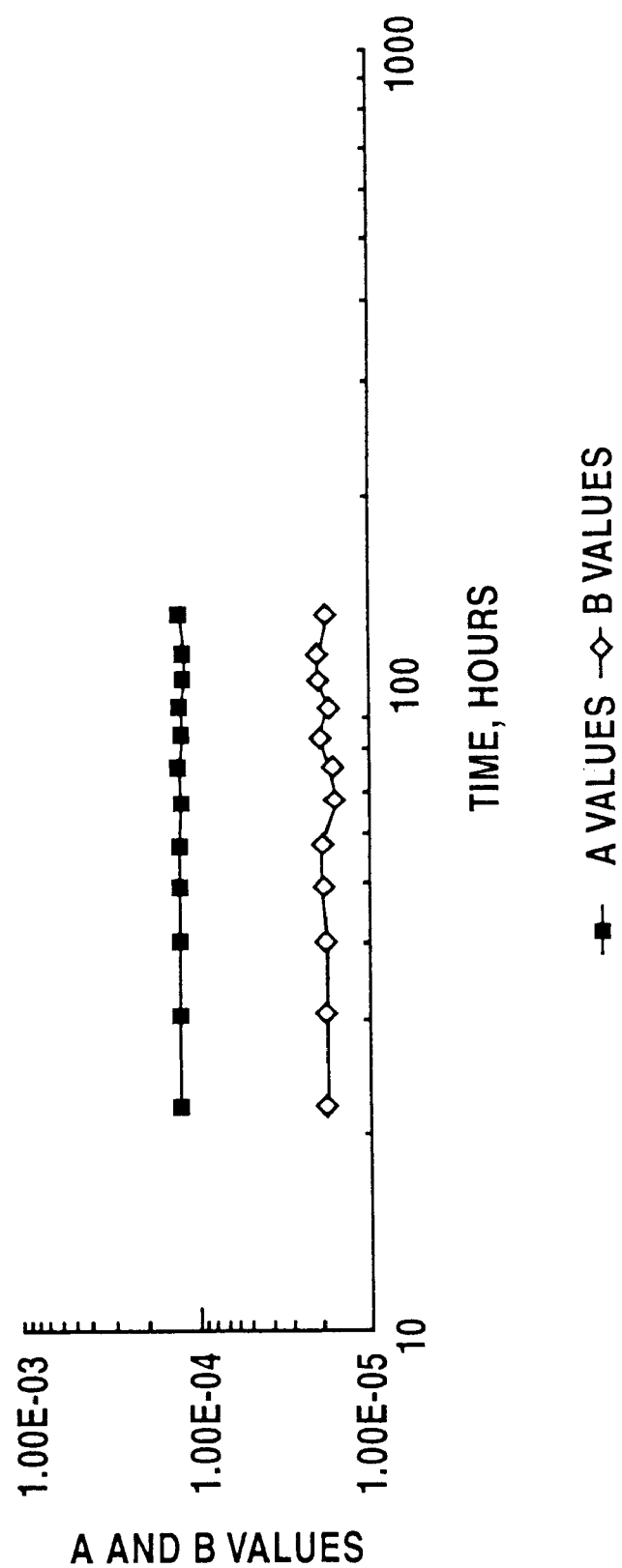
FIG. 15 is a graph showing normalized performance data for tetrakishydroxymethylphosphonium sulfate (THPS).

During the last THPS test series, a cell test apparatus was plumbed to the concentrate pressure of the RO system. Performance data were collected from the test cell and normalized. Following the test, the membrane sample was removed for microbiological examination. Normalized performance data are plotted in FIG. 15. Following the test run, no significant biofouling was seen on the surface of the membrane based upon a Gram staining material swabbed from the membrane surface.

Figure 10:
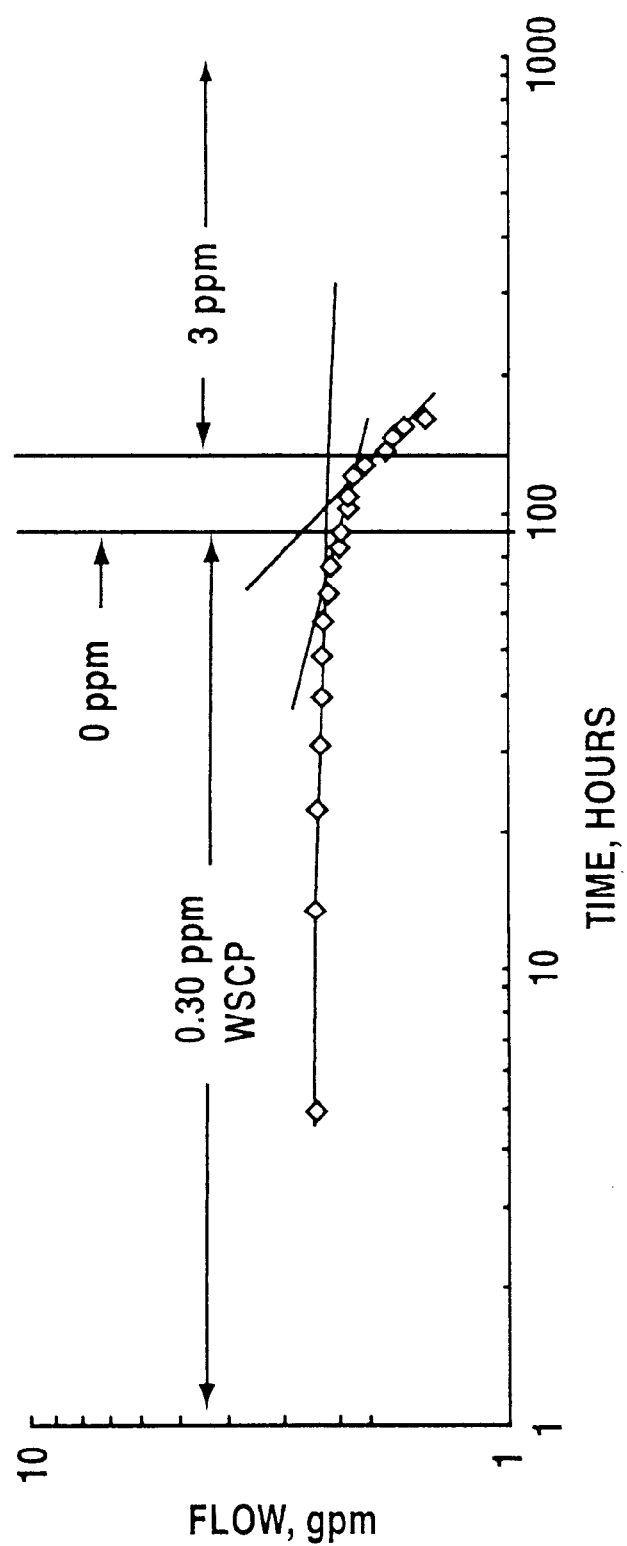
FIG. 10 is a graph representing poly(oxyethylene (dimethyliminio)ethylene(dimethyliminio)ethylene dichloride) (WSCP) test showing normalized flow vs. time.
Figure 11:
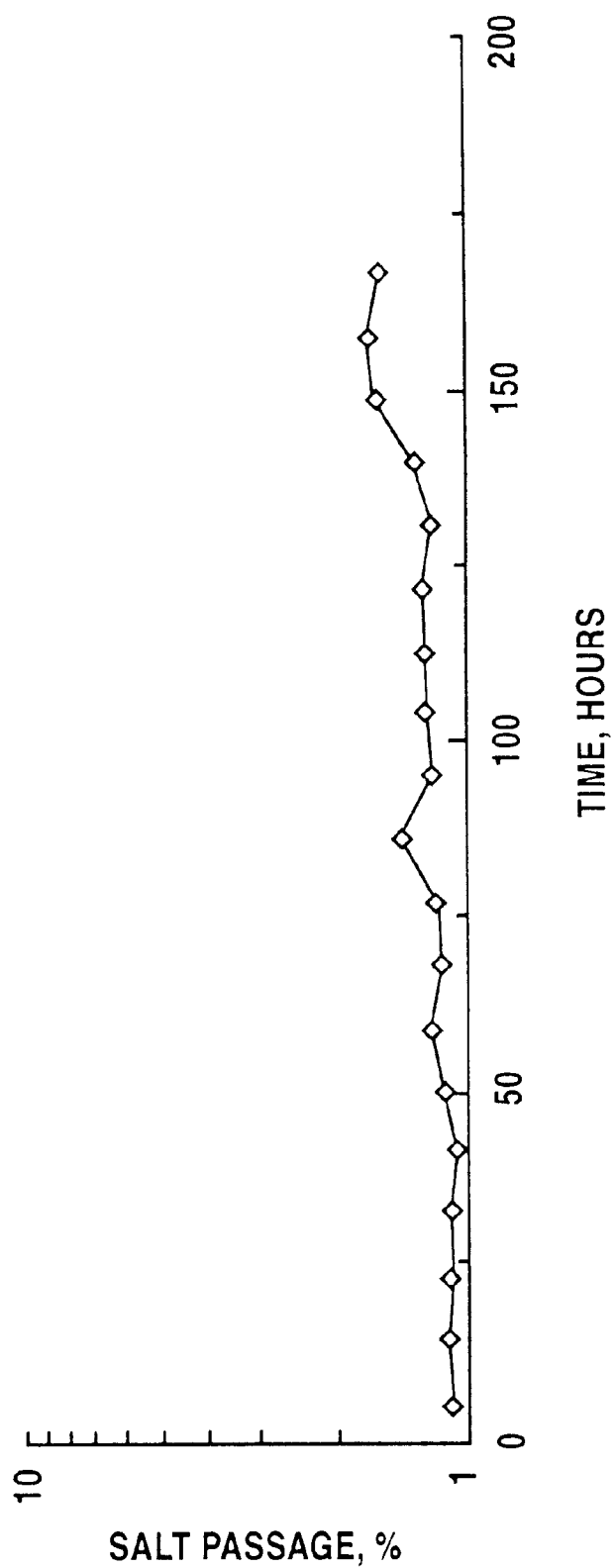
FIG. 11 is a graph representing poly(oxyethylene (dimethyliminio)ethylene(dimethyl iminio)ethylene dichloride) (WSCP) test showing normalized salt passage vs. time.
Figure 12:
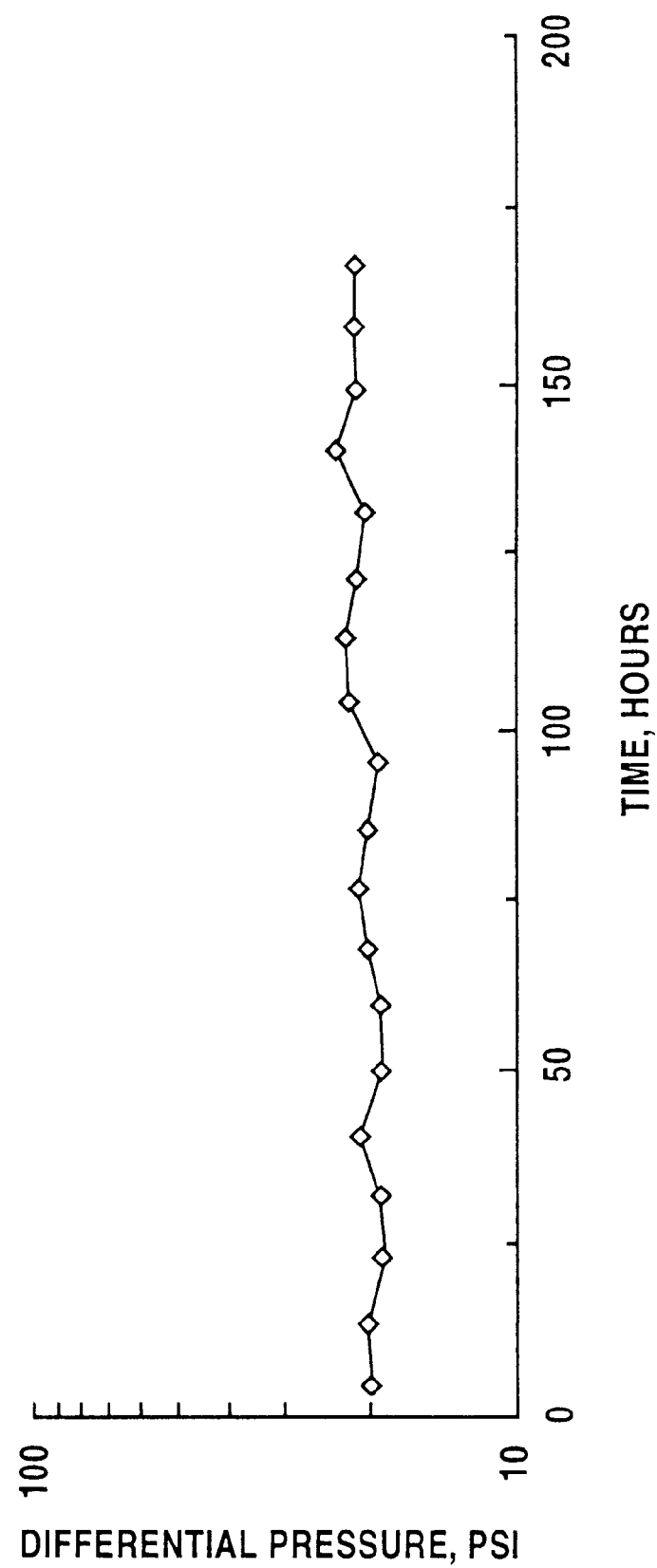
FIG. 12 is a graph representing poly(oxyethylene (dimethyliminio)ethylene(dimethyliminio)ethylene dichloride) (WSCP) test showing differential pressure vs. time.
Figure 13:
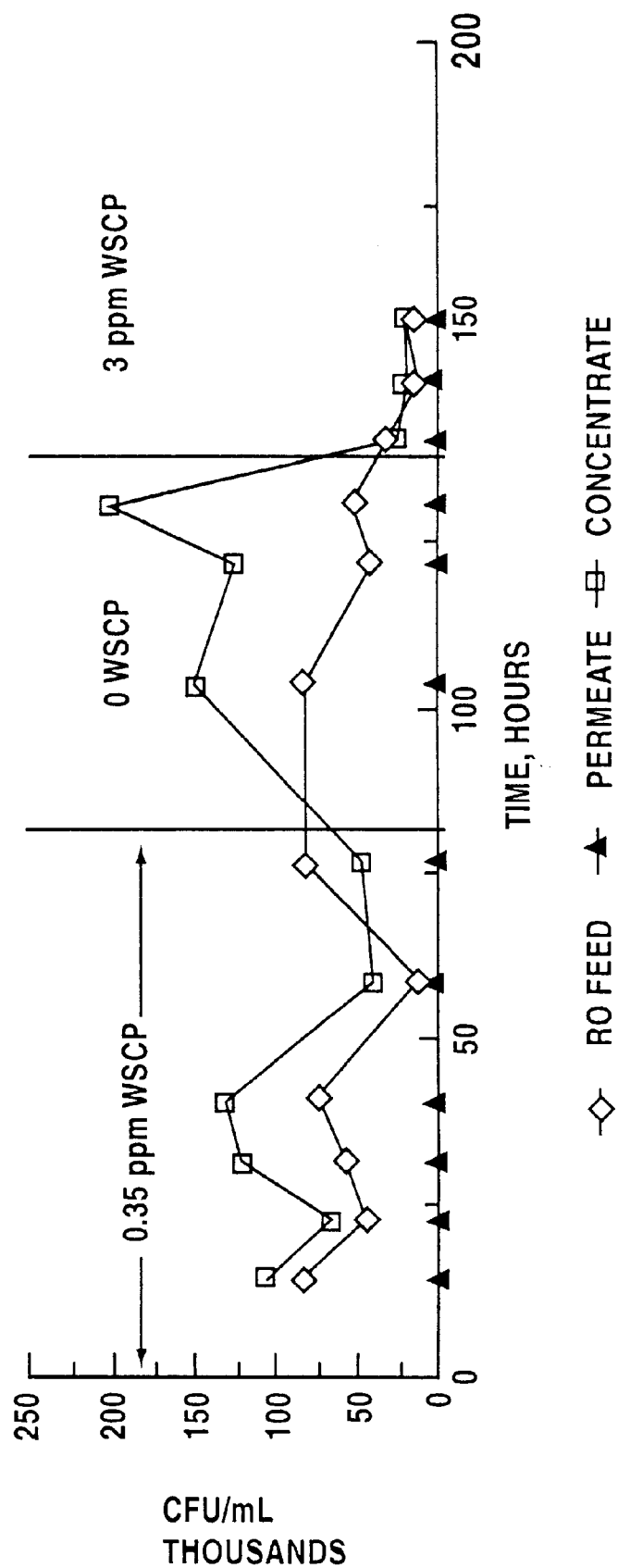
FIG. 13 is a graph representing poly(oxyethylene (dimethyliminio)ethylene(dimethyliminio)ethylene dichloride) (WSCP) test showing bacteria counts vs. time.
Figure 16:
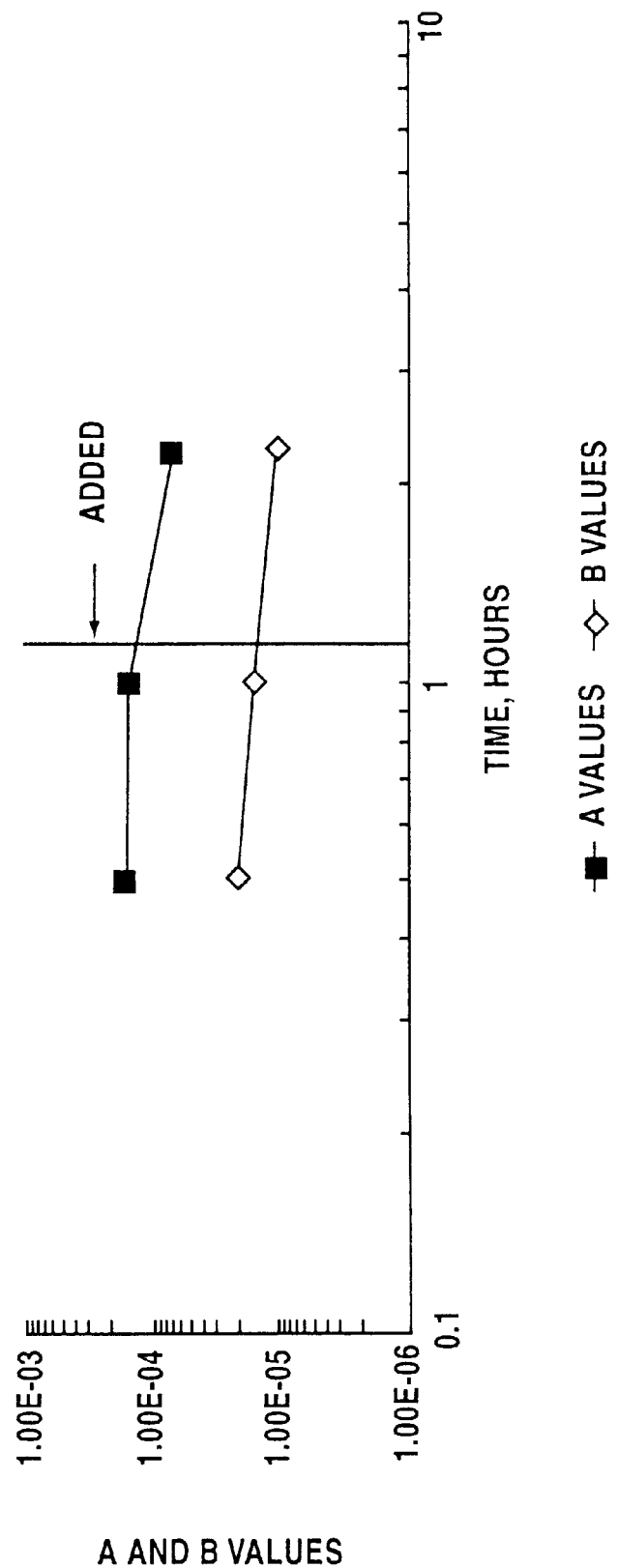
FIG. 16 is a graph representing a polyamide membrane response to a cationic surfactant.

Cell test and the RO test showed that both THPS and WSCP are compatible with polyamide RO membranes. This was an unexpected result based on the known incompatibility of cationic surfactants with polyamide membranes. A typical polyamide membrane response to a cationic surfactant is shown in FIG. 16. The breaks in the curves at the point of addition for this cationic biocide indicate immediate decreases in the A and B values for this membrane, which would be indicative of fouling. These breaks are not seen in the curves for WSCP and THPS, both of which are also cationic biocides. Initial tests as shown in FIG. 10 of the WSCP product indicated that this compound might cause membrane fouling. However, when WSCP addition was stopped, membrane fouling continued at the same rate. When WSCP addition was resumed at a higher dosage, the fouling rate did not change.

A final THPS test was conducted. When normalized permeate flow from this test was superimposed on the WSCP, fouling rates for both test were seen to be identical. This evidences that the feedwater changed during the WSCP tests, resulting in fouling of the pilot system.

Unexpectantly, the THPS, and to a lesser extent WSCP, actually reduced the amount of TOC passage through the membranes. Thus, the biocide passage through the polyamide membrane was virtually nil. Based upon bacteria counts, both WSCP and THPS appeared to control bacterial growth within the pilot RO system. At 75% recovery, salts and bacteria were concentrated about four times within the RO system. With the addition of both THPS and WSCP, viable bacteria counts of the concentrate stream were seen to always be less than four times the feed counts. Also, the slipstream cell test membrane showed no biofouling when analyzed after the THPS test. A further indication of biocide efficacy was observed during the WSCP test. Specifically, when the addition of WSCP was stopped, concentrate bacteria counts increased significantly. Upon resumption of WSCP feed, bacteria counts fell.

Furthermore, the test showed that HEDP and DETPMP may be mixed in all proportions with WSCP and THPS without precipitation. Therefore, a single product that combines both antiscalant and biocidal functionalities can be produced. The CFI test indicated that a blend of phosphonates and THPS will reduce colloidal fouling more effectively than will phosphonate alone. Larger colloidal particles tend to be more effectively swept through element feed passages than smaller particles. For this reason, the presence of a cationic substance in the phosphonate formulation may lower the rate of colloidal fouling by flocculation of colloidal particles contained in the RO feedstream.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of controlling fouling in an aqueous system using a separation membrane comprising introducing an effective amount of a formulation upstream of said separation membrane, wherein said formulation comprises at least one anionic antiscalant and at least one cationically-charged biocide, wherein said biocide has no hydrophobic moieties.

2. The method of claim 1, wherein said separation membrane is a reverse osmosis membrane.

3. The method of claim 2, wherein said reverse osmosis membrane is a polyamide membrane.

4. The method of claim 1, wherein the anionic antiscalant is a phosphonate based antiscalant.

5. The method of claim 1, wherein said anionic antiscalant is a mixture of 1-Hydroxyethane-1,1-diphosphonic acid and Diethylenetriaminepenta(methylenephosphonic acid), and said cationically-charged biocide is tetrakishydroxymethylphosphonium sulfate.

6. The method of claim 1, wherein said anionic antiscalant is a mixture 1-Hydroxyethane-1,1-diphosphonic acid and Diethylenetriaminepenta(methylenephosphonic acid) and said cationically-charged biocide is poly(oxyethlylene (dimethyliminio)ethylene(dimethliminio)ethylene dichloride).

7. The method of claim 1, wherein said aqueous system further comprises a pre-filter located upstream of said separation membrane, and said formulation is introduced at a point between said pre-filter and said separation membrane.

8. The method of claim 1, wherein said fouling is a result of at least colloidal fouling.

9. The method of claim 1, wherein said fouling is a result of at least biological fouling.

10. The method of claim 1, wherein said fouling comprises biological fouling, colloidal fouling, or both.

11. The method of claim 1, wherein said cationically charged biocide is present in an amount of from about 5% to about 50% and said anionic antiscalant is present in an amount of from about 5% to about 70%, based on the weight of the anionic antiscalant and cationically charged biocide present.

12. The method of claim 1, wherein said cationically-charged biocide comprises tetrakishydroxymethylphosphonium sulfate, poly(oxyethlylene(dimethyliminio)ethylene (dimethyliminio)ethylene dichloride), or any combinations thereof.

13. The method of claim 1, wherein said cationically-charged biocide consist essentially of tetrakishydroxymethylphosphonium sulfate, poly(oxyethlylene(dimethyliminio)ethylene(dimethyl i minio)ethylene dichloride), or any combinations thereof.

14. The method of claim 1, wherein said cationically-charged biocide is tetrakishydroxymethylphosphonium sulfate.

15. The method of claim 1, wherein said cationically-charged biocide is poly(oxyethlylene(dimethyliminio)ethylene(dimethyliminio)ethylene dichloride).

16. The method of claim 1, wherein the antiscalant comprises 1-Hydroxyethane-1,-diphosphonic acid, Diethylenetriaminepenta(methylenephosphonic acid), or any combinations thereof.

17. The method of claim 1, wherein the antiscalant is 1-Hydroxyethane-1,-diphosphonic acid.

18. The method of claim 1, wherein the antiscalant is Diethylenetriaminepenta(methylenephosphonic acid).

19. The method of claim 1, wherein the antiscalant is a mixture of 1-Hydroxyethane-1,-diphosphonic acid and Diethylenetriaminepenta(methylenephosphonic acid).

20. The method of claim 1, wherein said cationically charged biocide and said anionic antiscalant are introduced separately into the aqueous system.

21. The method of claim 1, wherein said fouling is membrane fouling.

22. The method of claim 1, wherein said cationically charged biocide contains no aromatic groups.

23. The method of claim 1, wherein said anionic antiscalant is at least one polymer.

24. The method of claim 23, wherein said polymer comprises at least one polyacrylic acid or salt thereof.

25. The method of claim 1, wherein said separation membrane is a reverse osmosis membrane, a nanofiltration membrane, a ultrafiltration membrane, a microfiltration membrane, or combinations thereof.

* * * * *

UNITED STATES PATENT AND TRADEMARK OFFICE
CERTIFICATE OF CORRECTION

PATENT NO. : 6,180,056 B1
DATED : January 30, 2001
INVENTOR(S) : McNeel, et al.

It is certified that error appears in the above-identified patent and that said Letters Patent is hereby corrected as shown below:

Column 10, Claim 6,
Line 4, "poly(oxyethlylene" should read --poly(oxyethylene--.

Column 11, Claim 13,
Line 2, "consist" should read --consists--; and
Line 4, "(dimethyl i minio)ethylene" should read --(dimethyliminio)ethylene--.

Signed and Sealed this

Third Day of July, 2001

Attest:

*Attesting Officer*

NICHOLAS P. GODICI
*Acting Director of the United States Patent and Trademark Office*